INVENTOR
Robert R. Donaldson
By Gerald B. Hoflot
his Attorney

Patented July 14, 1942

2,290,125

UNITED STATES PATENT OFFICE 2,290,125

REGULATING APPARATUS AND METHOD

Robert R. Donaldson, Pittsburgh, Pa., assignor to John M. Hopwood, Mount Lebanon, Pa.

Original application May 31, 1935, Serial No. 24,222, now Patent No. 2,177,823, dated October 31, 1939. Divided and this application September 2, 1938, Serial No. 228,150

5 Claims. (Cl. 137—164)

This invention relates to regulating apparatus and more particularly to systems for maintaining desired or predetermined proportions or relationships between the sum of the rates of flow of a plurality of fluids or gases and another but different fluid or gas.

This application is a division of my copending application Serial No. 24,222, filed May 31, 1935 now Patent No. 2,177,823, granted Oct. 31, 1939, and assigned to John M. Hopwood.

An object of this invention is to provide a regulating system which will function to maintain a predetermined relationship or proportion between the rate of flow of one quantity such as air, or the sum of the rates of flow of a plurality of flowing quantities such as air, gas, or liquid, and another quantity, whereby the rate of flow of one or more quantities may be utilized as a measure in controlling the rate of delivery of a still different quantity.

Other objects of the invention will, in part, be apparent and will, in part, be obvious from the following description taken into conjunction with the accompanying drawings in which.

Throughout the drawings and the specification, like reference characters indicate like parts.

Figure 1:
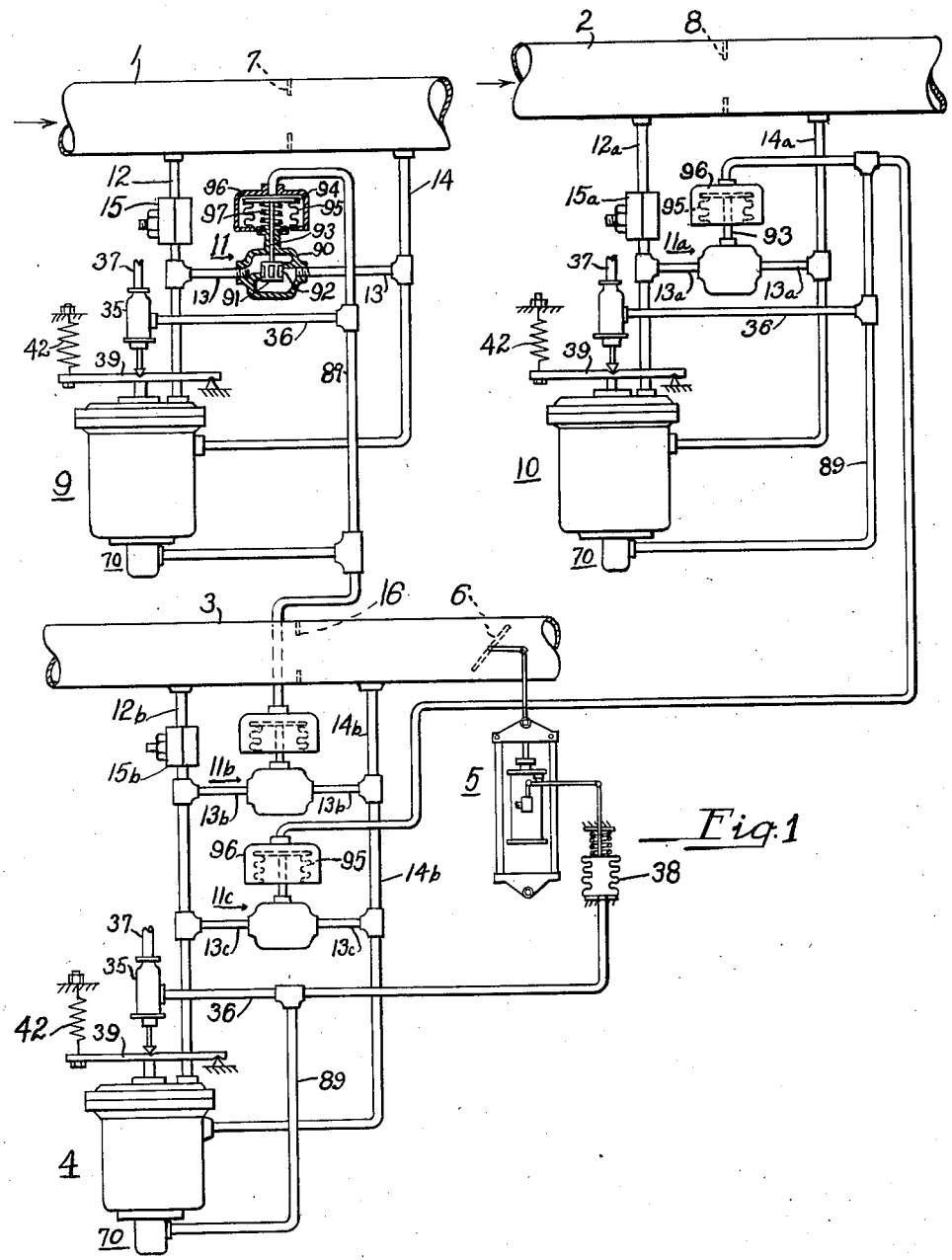
Fig. 1 is a more or less diagrammatic view of apparatus comprising a system embodying a form of the invention, and which is arranged to maintain a predetermined relationship between the sum of a plurality of changing quantities, and another but different quantity.

In Fig. 1 an arrangement is shown to illustrate, by way of example, the principles of the invention as embodied in apparatus arranged to maintain a definite relationship between a plurality of separate flowing quantities, such as fluids or gases, and other flowing quantities such as gases, fluids or liquids. In the illustrated embodiment of the invention, conduits 1 and 2 may be considered as carrying or conveying different kinds of fuel gas; for example, conduit 1 may be carrying blast furnace gas, conduit 2, natural gas, and conduit 3, another fluid such as air, for forming a combustible mixture with the gases delivered through or by conduits 1 and 2, to a furnace.

If conduits 1 and 2 are supplying fuel gases to a furnace, it follows that the amount of air which must be supplied for proper combustion will be dependent upon the sum total of the air required for each of these gases. In accordance with the invention as exemplified by Fig. 1, the amount of gas flowing in each conduit is measured and these measurements are translated into terms of control impulses whose magnitudes bear a definite relationship to the flow through them. These impulses may be utilized to modify the operation of a pressure-sensitive device 4 disposed to control the operation of a regulator or motor device 5 connected to actuate a damper or valve 6 in pipe 3 and thereby control the rate of air delivery through conduit 3 by and in accordance with the total rates of flow through conduits 1 and 2. For any given total rate of flow in pipes 1 and 2, there should be a given flow in pipe 3. Device 4 not only is responsive to total rates of flow in pipes 1 and 2 but also operates to maintain the flow in pipe 3 constant for each and every value of total flow in pipes 1 and 2.

To measure the rate of flow of fluid or gas through each of conduits 1 and 2, orifices 7 and 8 are mounted therein to develop pressure differentials for actuating pressure-responsive devices 9 and 10, respectively. Since devices 4, 9 and 10 in the arrangement shown by Fig. 1 may be of the same construction or design, a detailed illustration and description of one only is necessary, and such description will be made in connection with Fig. 2 which shows the details of construction thereof.

Device 9 responds to the pressure drop across an adjustable orifice 11 disposed in a by-pass comprising pipes 12, 13 and 14 connected across orifice 7. This by-pass is provided with a fixed orifice 15 located between the adjustable orifice and the high pressure or upstream side of orifice 7. Device 9 and orifice 11 are provided with means whereby orifice 11 may be so adjusted under the control of device 9 that the pressure drop across such orifice will be maintained substantially constant. Device 9 also is arranged to so modify the operation of device 4 that the rate of flow in conduit 3 will bear a definite relationship to the flow in pipe 1.

Device 10 responds to the pressure drop across an adjustable orifice 11a similar to orifice 11, disposed in a by-pass comprising pipes 12a, 13a and 14a connected across orifice 8. This by-pass includes a fixed orifice 15a located between the adjustable orifice and the upstream or high pressure side of orifice 8. Device 10 and orifice 11a are provided with means whereby orifice 11a may be so adjusted that the pressure drop across it is maintained substantially constant. Device 10 also operates independently of but in conjunction with device 9 to modify the action of device 4 in its control of regulator 5 and the combined effects of devices 9 and 10 on device 4 are such as to establish a rate of flow through pipe 3 that will bear a predetermined relationship to the total of the rates of flow in pipes 1 and 2.

Device 4 responds to the pressure drops across adjustable orifices 11b and 11c disposed in parallel in a by-pass comprising pipes 12b, 13b, 13c and 14b, connected across orifice 16 in pipe 3, and causes regulator 5 to adjust damper 6 to such a position as will establish a rate of flow in pipe 3 that bears a definite relationship to the total of the flows in pipes 1 and 2. This by-pass includes a fixed orifice 15b disposed in pipe 12b, i. e., between the adjustable orifices 11b and 11c and the upstream or high-pressure side of orifice 16. Since the pressure on the downstream side of fixed orifice 15b will be a function of the total opening of orifices 11b and 11c, and since the flow through by-pass 12b, 13b, 13c, and 14b will simulate the total flow in pipes 1 and 2, device 4 will respond and through regulator 5 cause damper 6 to be adjusted to a position where the flow through pipe 3 will have a direct relationship thereto. In other words, the total or combined flow opening of orifices 11b and 11c will be determined by the response of devices 9 and 10 to the flows in pipes 1 and 2, and the total opening of orifices 11b and 11c will determine the rate of flow in pipe 3. So long as no change occurs in the rates of flow in pipes 1 and 2, device 4 will effect the adjustments of damper 6 that are required to hold a constant differential across orifices 11b and 11c which results when the flow in pipe 3 is constant.

Devices 4, 9 and 10 may be of any suitable construction which is sensitive enough to respond to minute changes in pressure such as occur between the fixed orifices 15, 15a and 15b and the adjustable orifices 11, 11a, 11b, and 11c in the by-passes heretofore described, and capable of developing control impulses whose magnitudes vary with and bear a definite relationship to these minute changes in pressure. A device suitable for this purpose is illustrated more or less in detail in Fig. 2. This device comprises a flexible diaphragm 18, the outer edges of which are clamped between housing parts 19 and 20 bolted or otherwise positively secured together to form pressure-tight chambers 21 and 22. These parts are supported on a frame 23. The inner portion of diaphragm 18 is backed on both sides by backing plates 24 and 25 which are clamped tightly to the diaphragm by means of a through bolt 26 and sleeves 27 threaded thereon. Bolt 26 extends through openings 28 and 29 in housing parts 19 and 20 of the diaphragm casing and these openings are sealed by means of flexible diaphragms 30 through which the bolt passes. A tight joint is maintained at the point where the bolt passes through these diaphragms by means of washers 31 which are drawn up tightly on the diaphragm by means of nuts 32. The outer edges of diaphragms 30 are clamped tightly to the parts 19 and 20 by means of clamping rings 33 which may be secured to these parts in any appropriate or suitable manner. The upper end of bolt 26 is connected by a link 34 to an escapement valve 35 that controls the magnitude of the pressure of a motive fluid such as compressed air, delivered to a sending line 36 from a supply line 37. As shown in Fig. 1, the sending lines of devices 9 and 10 are connected to operate adjustable orifices 11, 11b, and 11a and 11c respectively, and the sending line of device 4 is connected to a bellows 38 that controls regulator 5.

Figure 2:
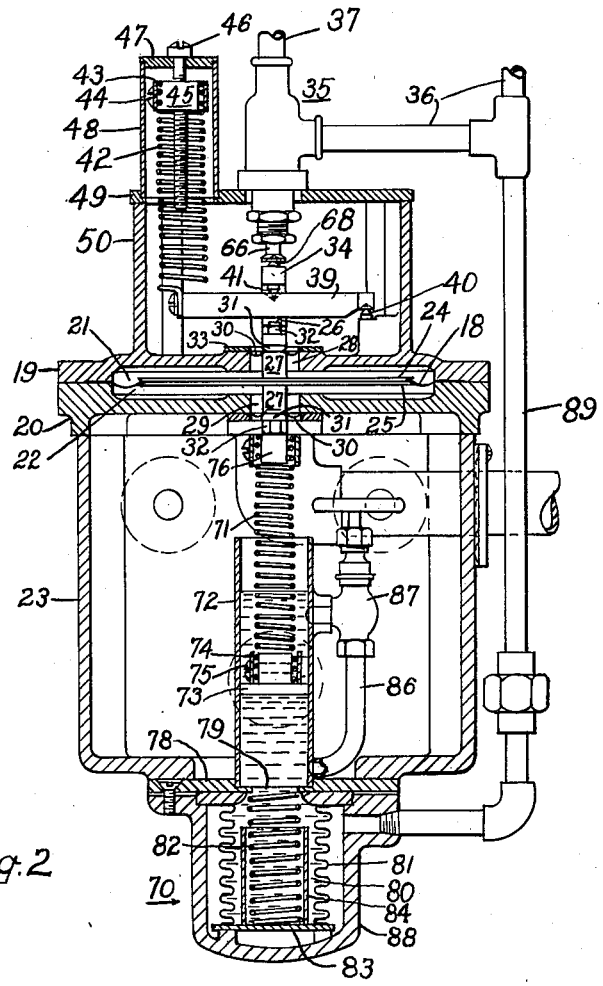
Fig. 2 is a view in section of a pressure-responsive device embodied in the system of Fig. 1.

The device of Fig. 2 also includes a lever 39 which is fulcrumed at one end on a knife-edge 40 and bears against a knife-edge 41 carried by link 34 and is yieldingly supported at its other end by a tension spring 42 which is adjusted to support or balance the weight of the parts connected to diaphragm 18 including parts of valve 35 and to provide means for adjusting the gradient of the device.

The upper end of spring 42 is secured with a clamping ring 43 and screw 44 to a block 45 which in turn is supported on a screw 46 by means of which the block may be raised or lowered to increase or decrease the tension in the spring. Screw 46 extends through a plate 47 carried at the upper end of a tubular support and housing 48, the latter being secured to a plate 49 which forms the cover of a housing 50 that extends upwardly from the diaphragm housing part 19.

Figure 3:
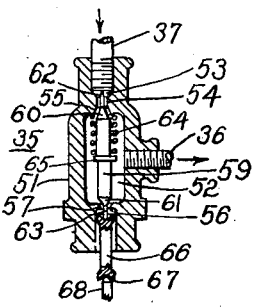
Fig. 3 is a view in section of an escapement valve embodied in the apparatus or device of Fig. 2.

Escapement valve 35, which is shown in detail in Fig. 3, comprises a body 51 having a chamber 52 therein which is provided at one end with an inlet port 53 to which pipe 37 is connected and communicates with chamber 52 through a restricted opening 54 having a tapered seat 55 at its inner end. The other end of chamber 52 has a restricted opening 56 which forms an exhaust port and the inner end of this opening has a tapered seat 57. The valve body has an outlet 58 to which the sending line 36 is connected.

A valve 59 is positioned within valve chamber 52 and is provided with tapered surfaces 60 and 61 adapted to cooperate with seats 55 and 57 respectively, to control the magnitude of the control impulses transmitted from supply line 37 to the sending line 36. Valve 59 is provided at each end with relatively slender extensions 62 and 63 that extend through openings 54 and 56 and guide the valve in its movements. A compression spring 64 which surrounds valve 59 and is retained between the upper end of valve chamber 52 and a flange 65 on the valve, urges the valve toward the position in which it is seated on exhaust port seat 57. Lower extension 63 rests in a socket on the upper end of a link 66 that connects valve 59 to link 34. The lower end of link 66 has a socket 67 in which is seated a tapered or needle pointed bearing 68 carried by link 34.

If diaphragm 18 moves either upwardly or downwardly, valve 59 is raised or lowered to vary the pressure in the sending line 36. When valve 59 is seated on the exhaust port seat 57, there is no leakage to the atmosphere so that pressure in the sending line will build up to a value equal to the pressure in the supply line 37. If valve 59 is seated on seat 55, the exhaust port is wide open so that pressure in the sending line and in the valve chamber will leak off and decrease to atmospheric value. When valve 59 is in other intermediate positions, so that the inlet and exhaust ports are both uncovered, the pressure in the sending line will vary in minute steps and may assume any value between the maximum and minimum values above noted, depending upon the relative throttling effects which take place at the inlet and exhaust ports.

As stated previously herein, the device shown in Fig. 2 need not be of any special construction so long as it will perform the functions desired. It is desirable, however, that this device be anti-hunting in character so that the adjustable orifices of Fig. 1 controlled thereby as well as regulator 5 will have time to come to a definite position for a given response of the device of Fig. 2 before further adjustments are required. To render device of Fig. 2 anti-hunting, a dashpot 70 is provided which is actuated by and in accordance with the pressure impulses delivered to sending line 36. The dashpot is yieldingly connected by a spring 71 to diaphragm 18 and always acts to urge the diaphragm toward a neutral or balanced position, i. e., to the position from which the diaphragm was moved in response to a change in the pressure acting thereon.

With reference to Fig. 1, devices 9 and 10 will operate to so adjust orifices 11 and 11a respectively, that the pressure drops thereacross will be maintained substantially constant so that for all practical purposes, diaphragm 18 has one normal position to which position the dashpot tends to urge it whenever a change in operating conditions causes the diaphragm to move.

The range of pressure variations to which the diaphragms 18 of devices 4, 9 and 10 respond is very small and may in some cases be only 0.001 inch of water, although the pressure impulses sent out by valves 35 thereof may vary over a wide range of pressures measured in pounds per square inch. Therefore, for all practical purposes it may be said that the pressures to which diaphragms 18 respond, i. e., the pressure drops across adjustable orifices 11, 11a, 11b and 11c for example, are substantially constant in value compared to the pressure sent out by valve 35 or to the pressure variations in the drop across either orifices 7, 8 or 16.

Dashpot 70 comprises a cylinder 72 having a piston 73 therein which is secured to the lower end of spring 71 by means of a clamping ring 74 and a screw 75. The upper end of this spring is anchored to a block 76 which is carried by the lower end of bolt 26. The lower end of cylinder 72 is secured to a plate 78 having an opening 79 therein that communicates with a displacement chamber 80 formed by a bellows 81. This bellows is urged toward its maximum volumetric capacity by means of a compression spring 82 which is interposed between plate 78 and a thrust plate 83 secured to the end of the bellows. Spring 82 operates within a tubular guide 84 which prevents the spring from buckling. A by-pass 86 connects the lower end of cylinder 72 to the portion of the cylinder disposed above dashpot piston 73 and is provided with an adjustable needle valve 87 for adjusting the rate at which a liquid such as oil, may flow from the space below the piston to the space above it, or vice-versa depending upon the amount and direction of movement of the piston and the amount of liquid displaced by the displacement chamber 80. The displacement chamber is mounted within a pressure-tight housing 88 that is connected by a pipe 89 to sending line 36, thus the displacement chamber is always acted upon by the control impulses transmitted to the sending line.

If it is assumed that the pressure acting upon diaphragm 18 is such as to cause it to move downwardly, spring 71 will be compressed slightly but at the same time valve 59 will be moved downwardly to open the inlet port 53 a predetermined amount and to throttle or close out the exhaust port 57 by the same amount, whereby the control pressure impulse delivered to sending line 36 and to housing 88 is increased. This increased pressure on bellows 81 causes it to contract and to build up a pressure on the fluid acting on the underside of dashpot piston 73. This causes the piston to move upwardly and to compress spring 71 so that a force is set up which tends to return diaphragm 18 to the position from which it was moved. As this pressure persists in the fluid, fluid is caused to pass through by-pass 86 into the space above dashpot piston 77, thereby relieving the pressure acting on the dashpot piston. The more the liquid flows through the by-pass the more the pressure is relieved on the dashpot piston so that it is gradually returned by spring 71 toward the position from which it was moved, thereby gradually nullifying the returning force exerted by the spring on the diaphragm.

In practice needle valve 87 is so adjusted that the effect of the dashpot on the diaphragm will be completely dissipated by the time that the control impulses delivered to the sending line have accomplished their operative function on apparatus actuated thereby.

If the pressure acting on diaphragm 18 is in such direction as to cause it to move upwardly under the influence of spring 42, valve 59 will be moved upwardly to restrict inlet port 55 and open exhaust port 57 by a proportionate amount, thereby decreasing the pressure impulse in sending line 36 and in the displacement chamber 88. When diaphragm 18 moves upwardly, spring 71 is stretched slightly which tends to retard upward movement of the diaphragm, but because of the decreased pressure acting upon the displacement chamber, the increase in volume of this chamber will cause oil to be displaced in such a direction as to draw the dashpot piston downwardly and further increase the tension of spring 71, tending to return the diaphragm toward normal position. While this is going on, oil starts to flow from the space above the dashpot piston to the space below it so that the force acting to draw the dashpot piston downwardly gradually diminished and finally becomes nil, at which time the adjustments in the valves or orifices controlled thereby will have been accomplished. At this time diaphragm 18 will be in balance with the pressure existing across its associated adjustable orifice.

Since the adjustable orifices 11, 11a, 11b and 11c are of the same design and construction, only one of these has been shown in detail, namely orifice 11 (see Fig. 1). This orifice comprises a valve body 90 having a valve plug 91 which is provided with a series of circumferentially spaced ports 92 through which flow through the by-pass takes place. These ports are preferably so shaped that the rate of flow through them will be substantially a linear function of the area of opening and which in turn is a linear function of the position of the valve plug. Valve plug 91 has a stem 93 which is connected to a thrust plate 94 secured to a bellows 95 mounted in a pressure-tight casing 96 to which the pressure impulses sent out by device 9 are transmitted. A compression spring 97 is supported between thrust plate 94 and socket 95 and yieldingly opposes downward movement of the thrust plate and the valve plug when increasing pressures are delivered to chamber 96.

Fixed orifice 15 is utilized to develop such a pressure drop that the pressure to which device 9 responds needs be only a fractional part of the maximum drop across orifice 7 of pipe 1. Device 9 being connected, as shown in Fig. 1, will respond to the pressure drop across adjustable orifice 11 and will tend to maintain valve plug 91 of this orifice in such position that this drop will be substantially constant. However, the drop across this orifice will vary a slight amount, as previously described herein, and this variation in drop will correspond to full-range operation of device 9. If we assume a condition of no flow through pipe 1 then device 9 will actuate its valve to closed position, in which case the pressure acting on the bellows of adjustable orifice 11 will be atmospheric and the valve plug thereof will be in open position. If flow starts in pipe 1 then there will be flow through the by-pass because of the pressure drop orifice 7. For each value of flow, diaphragm 18 of device 9 will be displaced a predetermined amount whereby valve 35 will transmit a pressure through its sending line to the bellows chamber of valve 11 and to the bellows chamber of valve 11b corresponding to the particular rate of flow through pipe 1. For each rate of flow up to maximum flow, device 9 will transmit a pressure of increasing value, each value being in proportion to each increasing value of flow through pipe 1. Therefore, it may be said that each position of valve plug 91' of adjustable orifice 11 will correspond to a definite rate of flow through pipe 1.

The above described operation of device 9 also applies to devices 4 and 10. For each rate of flow through pipe 2, device 10 will respond and transmit a pressure impulse to the bellows chamber of the adjustable orifice 11a and to the bellows chamber of adjustable orifice 11c corresponding to the particular rate of flow through pipe 2.

Since the bellows chambers of adjustable orifices 11b and 11c will be subject to pressures depending on the rate of flow through pipes 1 and 2 respectively, the rate of flow through the by-passes in which orifices 11b and 11c are disposed will develop a pressure drop to which device 4 will respond and transmit a pressure impulse through its valve 35 to bellows 38 of regulator 5. For each value of pressure transmitted to bellows 38 of regulator 5, regulator 5 will come to a definite position and adjust damper 6 to a position required by the total opening of orifices 11b and 11c.

Thus it will be seen that regulator 9 responds to changes in flow in pipe 1 and sets up a control force that is directly proportional to the flow in pipe 1 or, expressed another way, to the square root of the pressure drop across orifice 7 in pipe 1. Device 10 functions likewise to set up a control force that is a function of the flow through pipe 2 and which is proportional to the square root of the pressure drop across orifice 8. The control forces developed by devices 9 and 10 in turn are transmitted to bellows of adjustable orifices 11b and 11c which in turn cause device 4 to respond and set up a control force for controlling the operation of regulator 5 that is proportional to the sum of control forces of devices 9 and 10. Therefore the flow through pipe 3 will be directly proportional to the sum of the flows in pipes 1 and 2.

While but two adjustable orifices are shown in the by-pass connected across orifice 16 in pipe 3, it will be appreciated that more of these adjustable orifices may be connected in parallel depending upon the number of pipes carrying different fluids or gases that it is required to be proportioned to the flow through a plurality of pipes such as 1 and 2. From the above it will be apparent that device 4 will control the position of damper 6 to maintain the flow required in pipe 3 to balance the total flows in pipes 1 and 2, no matter whether changes in flow occur in pipes 1 and 2 or not.

Having thus described the invention what I desire to claim as new and desire to secure by Letters Patent is:

1. In a control system for measuring the flow of gases or liquids in a plurality of independent conduits each having an orifice therein and regulating the flow of gases or liquids through another conduit in accordance with the sum total of the flows in said plurality of conduits, comprising means associated with each conduit of said plurality of conduits and responsive to the rate of flow through the respective orifices thereof for developing separate fluid pressure control impulses that vary by and in accordance with the flow in said individual conduits of the plurality, said other conduit having an orifice therein and means for varying the flow therethrough, a regulator responsive to the pressure drop across the orifice in said another conduit and disposed to operate the flow varying means, and means responsive to said separate fluid pressure impulses for so modifying the effect of the pressure drop to which said regulator responds that the flow through said another conduit is caused to be adjusted to a value proportional to the sum of the flows in said plurality of conduits.

2. A system for automatically causing the flow of a quantity through a conduit to bear a definite relationship to the sum total of the flows of quantities through a plurality of individual conduits, comprising means responsive to the flow through each of the individual conduits of the plurality, means associated with and responsive to each of said individual flow responsive means for transmitting a control impulse that bears a definite relationship to the flow through its associated conduit, means responsive to the flow through said first-mentioned conduit and to the combined action of said control impulses for transmitting a totalizing control impulse that bears a definite relationship to the flows in all of said individual conduits and means responsive to said totalizing control impulse for so regulating the flow in said first-mentioned conduit that the flow therethrough bears a definite predetermined relationship to the sum of the flows in the individual conduits of said plurality.

3. That method of controlling the ratio of the flow of a first fluid to the sum of the flows of a plurality of second fluids which consists in passing a portion of each of said second fluids through separate variable constrictions, maintaining the differential pressure across said constrictions substantially constant by varying the openings of said constrictions; creating control impulses which are a function of the openings of the constrictions, and applying said control impulses to vary the flow of the first fluid in response to and in accordance with the combined effect of said control impulses.

4. That method of controlling the ratio of the flow of a first fluid to the sum of the flows of a plurality of second fluids which consists in providing a flow path for each of said second fluids and a variable constriction in each path, maintaining the differential pressure across said constrictions substantially constant by varying the openings of said constrictions; creating control impulses which are a function of the openings of the constrictions, and applying said control impulses to vary the flow of the first fluid in response to and in accordance with the combined effect of said control impulses.

5. Apparatus for controlling the flow of one fluid in accordance with the flow of a plurality of other fluids comprising, in combination, a conduit for said one fluid, means for controlling the flow therethrough, a conduit having an orifice therein for each of the plurality of fluids, a by-pass associated with each conduit and connected across the orifice therein, an adjustable orifice in each by-pass, a regulator associated with each of said adjustable orifices adapted to adjust the same so as to maintain the pressure drops thereacross substantially constant and to develop a control impulse that varies in magnitude with the extent of opening in the adjustable orifices, and means responsive to the combined effect of said control impulses for operating said flow controlling means in accordance with said combined effect.

ROBERT R. DONALDSON.